Figure 1:
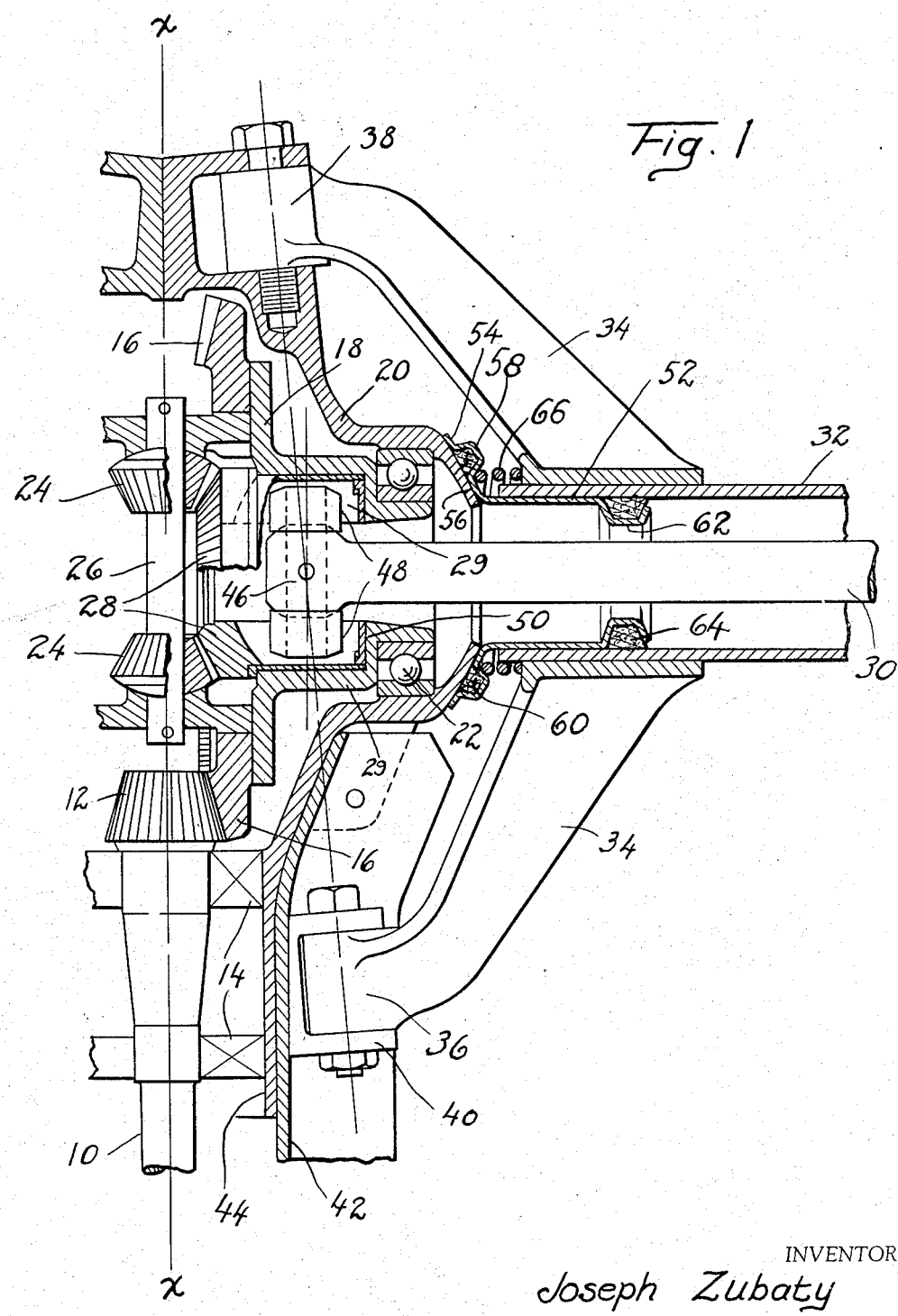

July 9, 1935. J. ZUBATY 2,007,670
SWINGING HALF AXLE FOR VEHICLES
Filed Sept. 13, 1933 3 Sheets-Sheet 1

INVENTOR.
Joseph Zubaty
BY Parker & Burton
ATTORNEYS.

July 9, 1935.  J. ZUBATY  2,007,670

SWINGING HALF AXLE FOR VEHICLES

Filed Sept. 13, 1933  3 Sheets-Sheet 2

INVENTOR.
Joseph Zubaty
BY Parker & Burton
ATTORNEYS.

INVENTOR.
Joseph Zubaty
BY Parker & Burton
ATTORNEYS.

Patented July 9, 1935

2,007,670

UNITED STATES PATENT OFFICE 2,007,670

SWINGING HALF AXLE FOR VEHICLES

Joseph Zubaty, Praha, Czechoslovakia

Application September 13, 1933, Serial No. 689,328
In Czechoslovakia September 20, 1932

16 Claims. (Cl. 180—73)

My invention relates to improvements in swinging half axles or, as they are commonly termed, "independently sprung axles" for motor vehicles, and particularly to improvements in the hinge mounting of said axles and particularly where embodied in a driven axle assembly. In the illustrative embodiment of my invention here disclosed it is shown as applied to a driven axle assembly.

An object is to provide such an axle of simple, sturdy, and inexpensive construction, the moving parts of the driven axle of which are completely enclosed, and to provide a construction of this character wherein the maximum radius of swinging, compatible with simplicity, and the minimum angle of swinging, results. I accomplsh this desirable result by locating the point about which each stub axle swings in close proximity to the longitudinal centerline of the car or the axis of the drive or propeller shaft. By so doing I am able to dispose the moving parts associated with the swinging support of the live half axle, including its hinge support, within the driving gear casing where such parts may be properly protected and lubricated.

To increase the radius of swinging movement, it is desirable to locate the point about which the stub axle swings as close to the longitudinal centerline of the car as is possible. To mount it exactly on this centerline complicates the driving mechanism or requires unusually large bearings to surround the driving mechanism or casing, and a novel characteristic of my improvement is that the pivot mounting for the axle tube, within the axis of which the hinge joint of the live half axle is disposed, is so arranged as to bring said hinge joint close to the car centerline. The construction is such as to be readily adaptable for use with various conventional designs.

A meritorious feature of my improvement consists in providing two spaced apart trunnions to support the inner end of the axle tube or casing, which encloses the live half axle, which trunnions are so arranged with respect to the centerline as to swing about an axis closely adjacent thereto.

A preferred construction is to arrange the axis of swing of the axle tube diagonally with respect to the car centerline, whereby I am able to bring the point about which the driving half axle swings in close proximity to the axis of the drive or propeller shaft.

In the illustrative embodiment preferred the tube or casing for the driving stub axle is supported at its inner end by the two arms of a fork. The inner ends of these arms are mounted upon trunnions. The trunnion support for the front arm is necessarily removed transversely from the centerline of the car as it is positioned outside of the drive or propeller shaft tube or casing and the frame member which abuts the same. The rear arm is supported upon a trunnion which may be located closer to the car centerline. The two trunnions are therefore obliquely disposed and the point of swing of the driving half axle is located on the axis of such trunnions and therefore nearer to the car centerline than is the front trunnion and than would be the case if the rear trunnion were located the same distance from the car centerline as the front trunnion.

A characteristic of my trunnion supports for the inner end of the stub axle casing is that silent and resilient trunnion bearing blocks are provided which eliminate the necessity of lubrication at such points and which possess the additional advantages of permitting movement that assists not only the vertical swinging of the stub axles but a fore and aft movement and improves the spring suspension characteristics. These yielding deformable blocks also serve to compensate for any misalignment which might occur due to the universal joint being out of line with the prolonged axis of the two trunnions.

A feature of importance is that the final driving gear for the driven half axle is provided with an axially elongated hollow hub within which is located the universal joint that supports the inner end of the stub axle and this entire assembly is located within the driving gear casing.

An additional feature is that I provide novel and simple means for preventing leakage of lubricant outwardly from the gear casing and seal the inner end of the stub axle tube or casing.

Figure 2:
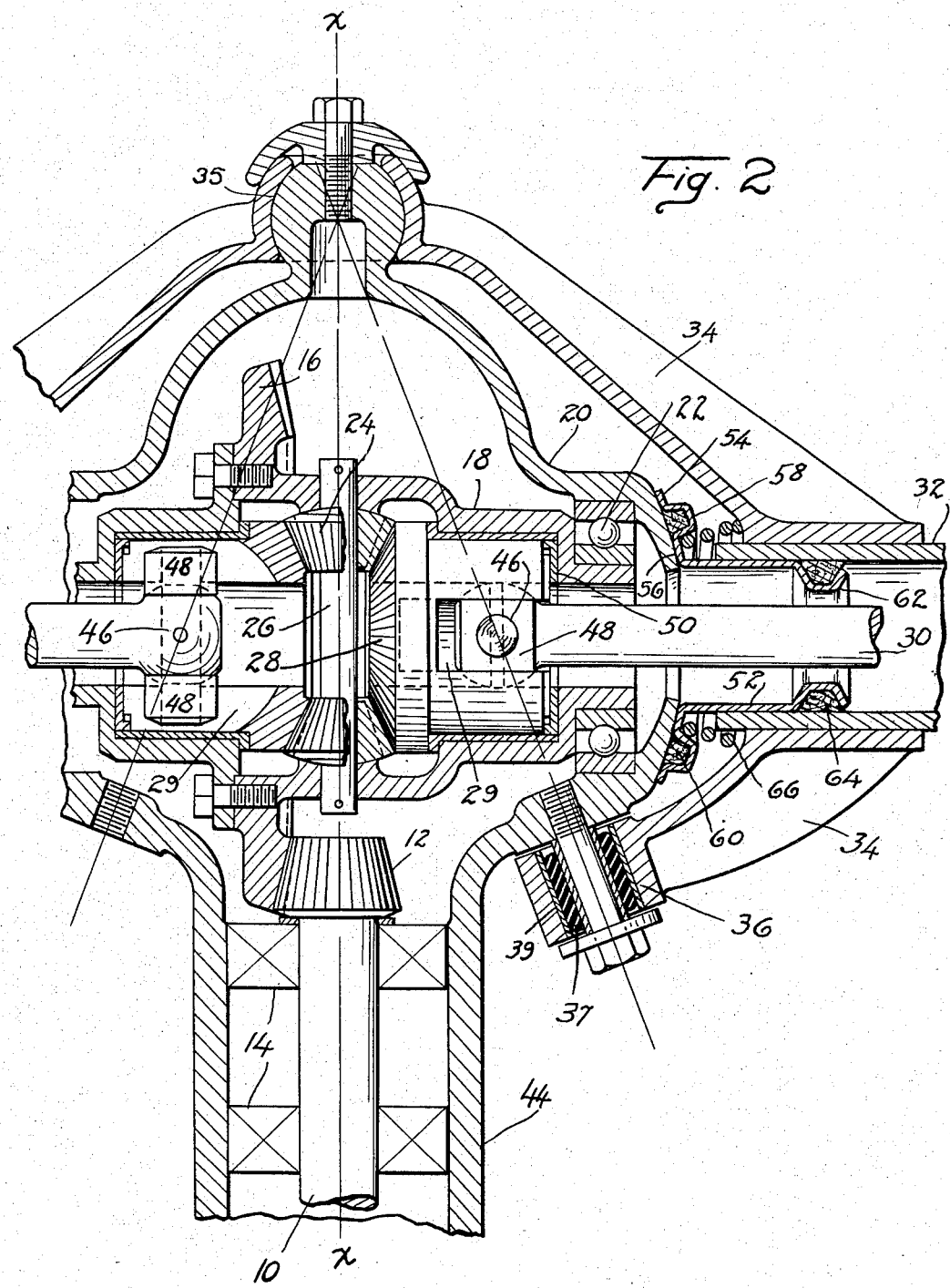
Figure 7:
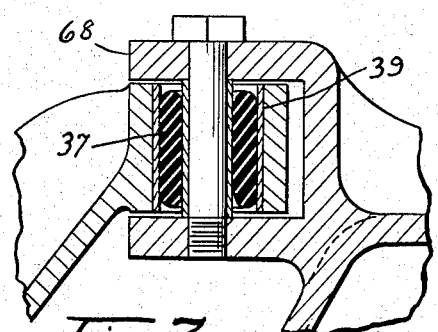
Figure 4:
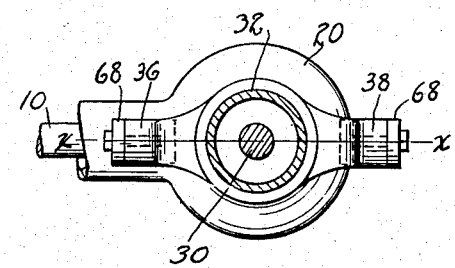
Figure 3:
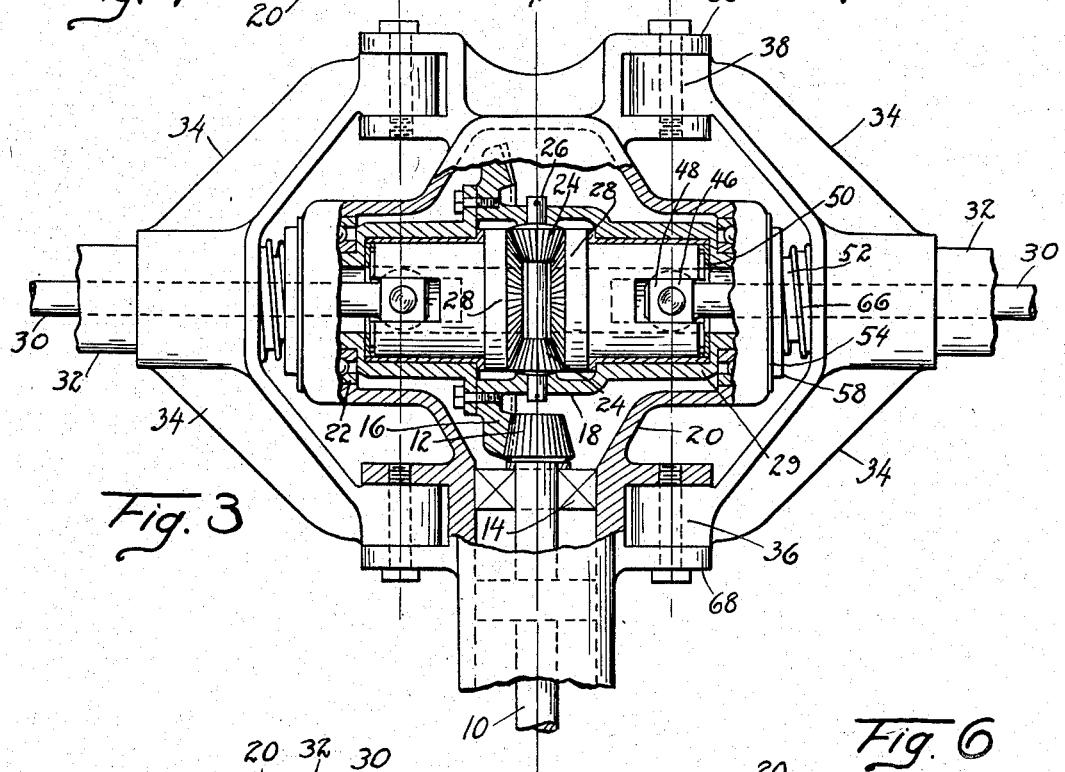
Figure 5:
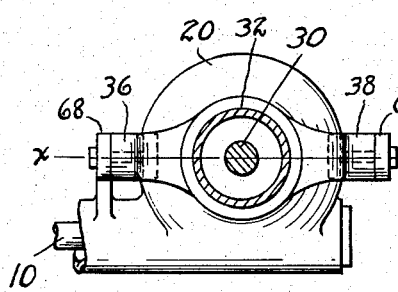
Figure 6:
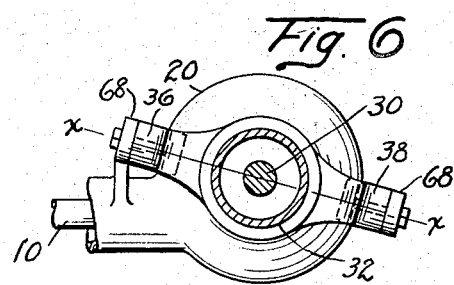

In the several figures of the drawings I have illustrated different designs which permit the accomplishment of certain desired objects of my improvement with different types of axle drive gearing. Various other objects, advantages, and important features of my invention will more fully appear from the following description, appended claims, and accompanying drawings, wherein:

Figure 1 illustrates a cross section through my improved swinging half axle showing its mounting, Figure 2 represents a modification of the construction shown in Figure 1, Figure 3 is a plan of a fragment of a swing axle assembly wherein the gear casing is broken away to illustrate the connection of the live axle therewith, Figure 4 is an elevation of the construction shown in Figure 3 taken on a line transversely through one of the half axles, Figure 5 is an elevation taken on the same line as Figure 4 showing the modified form of construction, Figure 6 is an elevation taken on the same line as Figure 4 showing a second modified form of construction, and Figure 7 is a sectional view through one of the trunnions which support the axle tube.

In the drawings, 10 indicates the propeller or drive shaft provided with a drive pinion 12 and bearing supports 14. The drive pinion 12 meshes with and drives the ring gear 16 of the drive gearing. The driving gear casing is indicated as 18 and is supported within housing 20 upon the bearing 22 as shown most clearly in Figures 1 and 2.

The differential pinions or gears 24 are mounted upon a spindle 26 and drive the final drive gear 28. Through this final drive gear the stub axle 30 is driven. In Figure 1 of the drawings one-half of the mechanism only is shown and only one of the swinging or oscillating stub or half axles with its surrounding axle tube is shown, but it is well understood that the other half of the mechanism is of the same construction and is complementary thereto. Figures 2 and 3 show two half axles.

The final drive gear 28 is provided with an axially elongated hub 29 which is hollow and is of sufficient diameter to receive therein the universal joint which supports the inner end of the driving stub axle 30 for driving and swinging movement. This hub is forked by grooves milled therein. In these grooves the universal joint 46 provided with ball shaped bearings and prismatic blocks 48 are mounted. This joint forms the pivot about which the stub axle swings. The hub is forked by grooves as shown and described and the free ends are braced with a retaining ring 50.

In the independent spring suspension of the wheels of a motor vehicle the stub or half axles are supported for swinging movement whereby each stub axle may swing independently of the other. The advantages of this type of construction are too well known to need citation. The stub axle 30, as here shown, is provided with the usual axle tube 32. The inner end of the axle tube is supported by a fork. The two arms 34 of the fork are journalled upon front and rear trunnions 36 and 38 respectively. In Figure 1 the front trunnion is mounted upon a bracket 40, which bracket is secured to the frame member 42 which frame member lies alongside of and is secured to the drive shaft casing 44. The rear trunnion 38 is carried by the driving gear housing 20 as shown.

In a construction of this type it is apparent that the front trunnion 36 can not be brought closer to the centerline of the car or to the axis of the drive shaft 10, which substantially corresponds with such centerline, than is permitted by the propeller shaft casing without departing from the simplicity of the design shown. Due to the oblique arrangement of the two trunnions, however, the rear trunnion is drawn in much closer to such centerline. By bringing the rear trunnion in close to the car centerline the universal joint 46, which is disposed on the prolonged axis of the two trunnions 36 and 38, is likewise drawn in substantially closer to the axis of the drive shaft or the car centerline than would otherwise be the case. It is also brought within the gear casing where it is protected and where it may be properly lubricated.

This universal joint may be brought in even closer to the car centerline or to the axis of the drive shaft, as shown in Figure 2 of the drawings, by mounting the two rear arms of the two forks of the complementary swinging half axles upon the same trunnion or bearing at the rear of the housing 20. In this construction the details of mounting the half axles are similar to that of Figure 1. The two constructions differ in that in the structure of Figure 2 the rear arm 34 of each axle tube 32 is extended to a greater length than the front arm and is mounted upon a spherical support 35 at the rear of the gear casing substantially on a line with the centerline of the car, which in each case is indicated by the dotted line $x$—$x$. The axis of swinging movement of the two arms of the axle tube is on a line with the center of the universal joint 46 and is arranged diagonally with respect to the centerline of the vehicle so as to bring the pivot of the half axle close to the centerline of the vehicle.

The trunnions 36 and 38 (Figure 1) are each provided with a silent block 37 of suitable resilient yielding material, such as rubber, which eliminates the necessity for lubrication and also permits a certain amount of fore and aft movement at such point and assists in the vertical swinging movement of the half axle thereby adding to the desirable spring suspension characteristics. These silent blocks serve another important purpose in that should there be any misalignment of the universal joint with respect to the prolonged axis of the two trunnions this would be compensated for by the compressibiilty of the blocks. This rubber block 37, as shown in Figures 2 and 7, is secured between inner and outer metal bushings 39 which are secured to the trunnion and fork end respectively so that the rubber block 37 is distorted by the swinging of the axle assembly.

There is also provided a suitable lubricating retaining member in the form of a tubular stamping 52 which is flanged outwardly at 54 at its inner end. It is provided at such inner end with an interiorly spherical face adapted to form a close contact with a corresponding face 56 formed upon the housing 20 so as to form a close contact therewith. The flanged end is provided with a recess 58 within which is disposed a suitable washer 60, (note Figures 1, 2, and 3).

The tubular portion of this member 52 is received within the axle tube 32 as shown. It is provided with a channel portion 62 within which is mounted a packing ring 64. An expansion spring 66 is shown which urges the tubular stamping against the gear casing. The washer or packing members 60 and 64 in conjunction with the stamping itself prevent the lubricant which flows outwardly through the large opening in the casing 20 through which the stub axle passes from passing outwardly between the casing 20 and the inner end of the axle tube 32.

In Figures 3 and 4 the gear casing is provided on opposite sides with two spaced apart brackets 68 which serve to support the arms 34 of the axle tube 32. The arms 34 are trunnioned upon said brackets 68 upon resilient silient blocks 37 as indicated particularly in Figure 7 and as heretofore described in the case of Figures 1 and 2. In the construction shown in Figures 3 and 4 the axis of swing is in the same plane as the drive shaft 10 and parallel thereto. The connection between the inner end of the live half axle through the universal joint is within the drive gear casing.

In the construction shown in Figure 5 the trunnions 36 and 38 and the axis of swinging of the axle tube 32, while parallel to the drive shaft 10, are positioned above such shaft. In this construction the drive shaft 10 is coupled with the drive gearing through a worm drive.

In the construction shown in Figure 6 there is represented a gear casing 20 wherein is located hypoid drive gears of conventional design. In this construction a compact and unitary assembly is provided through arranging the axis of swing of the half axle diagonally with respect to the centerline of the drive shaft 10 with the forward end tilted upwardly as shown. The forward bracket is carried by the propeller shaft casing and is positioned above the propeller shaft. The rear bracket is considerably lower. This particular arrangement possesses another advantage in that it serves to better take the shocks as the car travels over the road. In the several constructions silent block mountings are provided as hereinabove set forth.

What I claim:

1. In a motor vehicle, a half axle supported at its inner end for swinging movement, an axle tube enclosing the half axle and supported at its inner end for swinging movement upon spaced apart trunnions, one trunnion being arranged substantially on the centerline of the vehicle and the other spaced transversely therefrom.

2. In a motor vehicle, two half axles each supported at its inner end for swinging movement upon a universal joint, an axle tube for each half axle provided at its inner end with two arms, one arm being substantially longer than the other, the shorter arm being mounted for swinging movement about a pivot spaced transversely of the vehicle outwardly beyond said universal joint, the longer arm being mounted for swinging movement about a pivot in line with said universal joint and the pivot of the shorter arm but spaced inwardly thereof transversely of the vehicle.

3. In a motor vehicle having a driven swinging half axle, drive gearing, a housing for the gearing, said swinging half axle extending through an enlarged opening in the housing, an axle tube surrounding said half axle, a lubricant retainer having a cylindrical end portion received within the inner end of said tube and a flaring hemispherical portion abutting the outer face of said housing, a packing ring carried by the inner face of said flaring portion, and a packing ring carried by the outer face of said cylindrical portion, and spring means holding said cylindrical portion against the face of said housing.

4. In a motor vehicle having drive gearing, a casing surrounding said gearing, a half axle coupled within said casing with said gearing through a universal joint, an axle tube enclosing said half axle and pivotally supported externally of said casing for swinging movement about an axis extending diagonally with respect to the centerline of the vehicle and passing substantially through said universal joint and upon a mounting yieldable to permit limited shifting of said axis.

5. In a motor vehicle having two half axles each supported at its inner end for independent swinging movement, an axle tube for each half axle supported at its inner end for swinging movement, drive gearing including a final drive gear for each half axle provided with a hollow hub and a universal joint supporting the inner end of the half axle interiorly of said hub, a housing surrounding said drive gearing hollow hub and axle end, and a lubricant retaining member having one end received within the inner end of the axle tube and the opposite end flared outwardly and abutting an outer face of said housing.

6. In a motor vehicle having a driven swinging half axle, drive gearing, a housing for the gearing, said swinging half axle extending through an enlarged opening in the housing, an axle tube surrounding said half axle, a lubricant retainer having a cylindrical end portion received within the inner end of said tube and a flaring hemispherical portion abutting the outer face of said housing, a packing ring carried by the inner face of said flaring portion, and a packing ring carried by the outer face of said cylindrical portion.

7. In a motor vehicle, drive gearing, a casing forming a sealed enclosure about said gearing, a pair of live axles each coupled at one end by a universal joint with the gearing within the casing, an axle tube surrounding each live axle having a forked end encompassing the casing, a pair of trunnions for each axle tube arranged externally of the casing at opposite ends thereof and adjacent thereto forming pivotal supports for the forked end of the axle tube, said trunnions so arranged that the axis of swing of the tube passes through the universal joint of its live axle and extends so diagonally with respect to the centerline of the vehicle that the universal joint through which it passes is disposed in close proximity to the vehicle centerline.

8. In a motor vehicle, drive gearing including a pair of drive gears each having a hollow hub, a casing enclosing said gearing, a pair of live axles each supported at its inner end upon a universal joint within the hollow hub of a drive gear, an axle tube surrounding each live axle and having a forked end encompassing said casing, a pair of trunnions arranged externally at opposite ends of the casing supporting said axle tube upon said forked end to swing about an axle extending through the universal joint of its live axle and diagonally with respect to the vehicle centerline whereby the universal joint of the live axle arranged therein is disposed in close proximity to the vehicle centerline.

9. In a motor vehicle, drive gearing, a casing surrounding the gearing, a drive shaft extending into one end of the casing and coupled with the gearing therein, a pair of live axles extending into the casing from opposite sides and each coupled with the gearing therein through a universal joint, an axle tube surrounding each live axle and having a forked end embracing the casing, a pair of trunnions supporting the forked end of each axle tube, each pair of trunnions so disposed upon opposite sides of the casing that the axis of swing of each tube extends through the universal joint of its live axle and diagonally with respect to the centerline of the vehicle and so that the two trunnions arranged at the end of the casing opposite to that end at which the drive shaft enters are located in substantially closer proximity to the vehicle centerline than the two trunnions arranged at the drive shaft end of the casing, and the universal joints of the live axle arranged in said axes of swing are disposed in proximity to the vehicle centerline.

10. A swinging axle assembly for a motor vehicle comprising, in combination, drive gearing, a casing enclosing said gearing and having axle apertures on opposite sides, a pair of live axles each coupled through a universal joint with the gearing within the casing and extending outwardly through one of said axle apertures, an axle tube enclosing each live axle and terminating at its inner end spaced from the casing, each tube having a fork at its inner end embracing the casing and supported upon a pair of trunnions arranged externally thereof for swinging movement about an axis extending out of parallelism to the centerline of the vehicle and through the universal joint of the live axle enclosed by the tube so that the universal joint through which it passes is disposed in closer proximity to the vehicle centerline than at least one of said trunnions, and means arranged between the end of the axle tube and the casing sealing the axle aperture through the casing and the end of the tube.

11. A swinging axle assembly for a motor vehicle comprising, in combination, drive gearing, a casing enclosing said gearing and having axle apertures on opposite sides, a pair of live axles each coupled through a universal joint with the gearing within the casing and each extending outwardly through one of said axle apertures, an axle tube enclosing each live axle and terminating at its inner end spaced from the casing, each axle tube having a fork at its inner end embracing the casing and supported for swinging movement upon a pair of trunnions arranged externally of the casing, each pair of trunnions being so arranged that the axis of swing of each tube extends through the universal joint of its live axle, and means bridging the space between the end of each axle tube and the casing sealing the end of the tube and the axle aperture through the casing.

12. A swinging axle assembly for a motor vehicle comprising, in combination, drive gearing, a casing enclosing said gearing and having axle apertures on opposite sides, a pair of live axles each coupled through a universal joint with the gearing within the casing, and each extending outwardly through one of said axle apertures, an axle tube enclosing each live axle and having a fork at its inner end embracing the casing and supported for swinging movement upon a pair of trunnions arranged externally of the casing, each pair of trunnions being so arranged that the axis of swing of each tube extends through the universal joint of its live axle, each pair of trunnions being spaced apart a distance substantially greater than the distance between the centerline of the vehicle and the universal joint disposed within the axis of swing of the tube supported upon said trunnions.

13. The invention defined in claim 11 characterized in that at least one trunnion of each pair includes a yieldable mounting deformable under pressure to permit universal shifting of the axis of swing of the tube within the limitation of the universal joint through which it passes.

14. A swinging axle assembly for a motor vehicle, comprising driving gear mounted in a carrier enclosed in a housing, a pair of live axles extending through apertures in the housing and connected to the carrier by universal joints disposed within the housing, axle tubes surrounding the live axles and providing with forked ends pivotally mounted externally of the housing on axes which pass through the centres of the universal joints, and means arranged between the ends of the axle tubes and the housing to seal the apertures in the latter through which the live axles pass.

15. In a motor vehicle, drive gearing, a casing surrounding said gearing, a half axle pivotally coupled with the gearing within the casing, an axle tube surrounding said half axle, said axle tube terminating at its inner end spaced from the casing, means supporting said axle tube upon the casing for swinging movement, and a lubricant retainer having a cylindrical portion at one end telescopically received within the inner end of the axle tube, oil sealing means between the cylindrical portion of the lubricant retainer and the inner wall of the axle tube, said retainer having a flaring portion at the opposite end engaging the casing and shiftable thereover, oil retaining means between the flaring portion of the lubricant retainer and the gear casing wall, said retainer bridging the space between the inner end of the axle tube and the casing sealing the axle opening through the casing wall and the end of the tube.

16. In a motor vehicle, drive gearing, a casing surrounding the gearing and having opposed axle apertures, a pair of half axles pivotally coupled with the gearing within the casing and extending outwardly through the apertures in the casing wall, an axle tube surrounding each half axle, means supporting the axle tubes upon the casing for independent swinging movement, a lubricant retainer for each axle tube having a cylindrical portion at one end and a flaring portion at the opposite end, each retainer having its cylindrical portion telescopically received within the end of its axle tube adjacent to the casing and having a channel formed therein, a lubricant sealing element disposed within said channel engaging the inner wall of the axle tube, said retainer having a channel formed in its flared portion, and a lubricant sealing element disposed within said channel engaging the wall of the casing surrounding the axle aperture.

JOSEPH ZUBATY.